United States Patent [19]

Faust

[11] Patent Number: 4,875,350
[45] Date of Patent: Oct. 24, 1989

[54] PUSH LOCK ACTUABLE ANTI-THEFT VEHICLE DEVICE

[75] Inventor: James H. Faust, Hoffman Estates, Ill.

[73] Assignee: ABC Auto Alarms, Inc., Elk Grove Village, Ill.

[21] Appl. No.: 228,336

[22] Filed: Aug. 4, 1988

[51] Int. Cl.⁴ .................... B60R 25/04; E05B 65/19
[52] U.S. Cl. ........................................ 70/241; 70/257;
70/DIG. 49; 200/43.08; 292/DIG. 14;
307/10.2; 340/426
[58] Field of Search ............... 70/240, 241, 256, 257,
70/387, DIG. 49; 340/64, 542, 426; 307/10
AT, 10.2; 200/1 A, 43.08, 43.13, 43.18, 321;
292/125, 225, DIG. 14, DIG. 25

[56] References Cited

U.S. PATENT DOCUMENTS

| | | | |
|---|---|---|---|
| 1,846,782 | 2/1932 | Ballamos | 70/257 |
| 2,796,274 | 6/1957 | Sigel | 292/DIG. 14 X |
| 2,810,026 | 10/1957 | Vigren et al. | 200/1 A |
| 3,538,725 | 11/1970 | Guenther et al. | 70/241 |
| 3,548,373 | 12/1970 | Rivera et al. | 340/64 |
| 3,831,406 | 8/1974 | Gebhard et al. | 70/241 X |
| 4,538,135 | 8/1985 | Turner | 70/241 X |
| 4,595,903 | 6/1986 | Arlasky et al. | 70/241 X |
| 4,752,092 | 6/1988 | Faust | 292/DIG. 14 X |

FOREIGN PATENT DOCUMENTS

1084899 12/1967 United Kingdom ............ 200/43.08

Primary Examiner—Gary L. Smith
Assistant Examiner—Douglas E. Ringel
Attorney, Agent, or Firm—Silverman, Cass & Singer, Ltd.

[57] ABSTRACT

A push lock actuable anti-theft vehicle device for a vehicle having a hood. A hood coupling member for coupling the hood to the vehicle is secured within an engine compartment of the vehicle and has a first locked position and a second unlocked position. The hood coupling member is operable by a keyed push lock member through a cable. An electrical contact is opened or closed by an engagement member of the push lock member upon actuation of the coupling member. The push lock member is manually operable to lock the coupling member and is operable by a restricted distribution key to unlock the coupling member.

12 Claims, 3 Drawing Sheets

PUSH LOCK ACTUABLE ANTI-THEFT VEHICLE DEVICE

BACKGROUND OF THE INVENTION

1. Field of the Invention

This invention relates generally to anti-theft devices for vehicles and more particularly, provides a lock assembly for an anti-theft vehicle device which is operable remotely from the interior of the vehicle in which it is installed. The lock assembly is constructed to effect locking of the vehicle's hood and suppression of the vehicle's ignition system.

2. Description of the Prior Art

Vehicle theft prevention systems include components intended to provide protection and warnings against any unauthorized attempts to gain access to the vehicle for the purpose of theft, either of the vehicle or the contents of the interior thereof. Many types of visual and audible alarms are provided which are triggered by breaking windows, tampering with ignition systems or by causing the vehicle to be moved. Frequently used methods of stealing vehicles involve starting of the vehicle either by crossing of the ignition wires or by gaining access to the interior of the engine compartment and manipulating the ignition system therefrom.

Hood latches are customarily provided to assure that the normally spring biased hood will not accidentally open during the operation of the vehicle. Such latches typically include a latch lever on the hood that engages a catch or keeper member located in the interior of the engine compartment. The latch lever is spring biased to be normally engaged with the keeper and can be actuated from the exterior of the vehicle or by a cable that extends into the passenger compartment through the firewall and dashboard of the vehicle, terminating in a handle. Manipulation of the handle, such as by pulling thereon, will cause the latch lever to be fully or partially disengaged from its keeper and the hood is either fully released or enabled for release by an operator from the exterior of the vehicle.

The conventional hood latch and the release apparatus have become a weak link in the chain of protection presently available against theft of the vehicle and/or various operating components located within the engine compartment. This is because access to the hood handle within the passenger compartment and, consequently, access to the interior of the engine compartment, can be achieved rather easily by merely breaking a window of the vehicle, forceably unlocking a door of the vehicle, or any other mode of entry. Moreover, if a hood latch is employed that is actuable from the exterior of the vehicle, access to the engine compartment is readily available.

Ignition suppression systems have also been developed that disable the ignition system of the vehicle. Such systems are typically activated and deactivated by a keyed switch mechanism that can be positioned within the interior of the vehicle or can be accessible from the exterior of the vehicle by a user to prevent unauthorized starting of the vehicle. However, if access to the engine compartment is not deterred, these systems themselves can be disabled.

Vehicle theft prevention systems have also been designed to incorporate both a positive locking of a vehicle hood and an ignition suppression system and/or various types of alarm and motion detector devices. Such systems, however, normally require the use of a key member to lock and unlock the vehicle's hood and to activate and deactivate the ignition suppression system.

It is desirable that additional precautions be taken against vehicle theft. One precaution would be to prevent the release of the vehicle hood by utilizing a positive hood lock assembly that can be manually activated to lock the hood or the hood latch and simultaneously provide suppression of the ignition system upon actuation of the lock assembly without the need of a key member. Such an assembly would be operable from within the passenger compartment, and could preferably only be deactivated with the use of a restricted distribution key or the like.

SUMMARY OF THE INVENTION

The above and other disadvantages of the prior art are overcome in accordance with the present invention by providing a push lock actuable anti-theft vehicle device for a vehicle having a hood. The device includes a coupling member having a first locked position and a second unlocked position that is secured within an engine compartment of the vehicle to couple the hood to the vehicle and is operable by a keyed push lock member through a cable. The push lock member includes an engagement member that simultaneously activates or deactivates a desired electrical circuit upon actuation of the coupling member. Preferably, the push lock member is manually operable to lock the coupling member and is operable by a restricted distribution key to unlock the coupling member and can be operable remotely from the interior of the vehicle.

DESCRIPTION OF THE PREFERRED EMBODIMENTS

Figure 1:
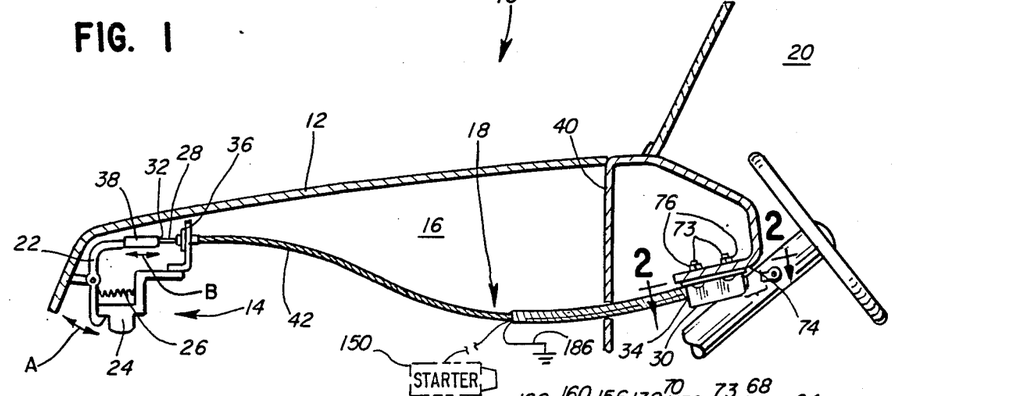
FIG. 1 is a representation of the hood and front compartment of a vehicle having an anti-theft vehicle device of the present invention installed therein.

Referring to the drawings, in FIG. 1 there is illustrated a diagrammatic representation of the forward section of a vehicle 10 illustrating a hood 12 in closed condition, a hood latch 14 installed within an engine compartment 16 and an anti-theft vehicle device 18 installed within the engine compartment 16 and extending into the passenger section 20 of the forward section of the vehicle 10.

The hood latch 14 secures the hood 12 to the vehicle 10 and is usually mounted at the forward portion of the engine compartment 16. To secure the hood 12 to the vehicle 10, the hood latch 14 includes a pivotable latch member 22 that is secured to the hood 12. The pivotable latch member 22 engages on one end with a keeper 24 that is secured within the engine compartment 16.

To engage and disengage with the keeper 24, the latch member 22 can pivot in the direction indicated by arrow A as illustrated in FIG. 1. To assist the latch member 22 in disengaging from the keeper 24, the latch member 22 can be outwardly spring biased by a spring member 26.

Typically, the latch member 22 is disengaged from the keeper 24 in one of two ways. The first way is by direct manipulation of the latch member 22 by a user by reaching through the grill or underneath the front end of the vehicle 10. The second way is by use of a release cable which is secured to the latch member 22 on one end and extends into the passenger section 20 to be remotely operable therefrom. In either event, the latch member 22 is rotated to disengage from the keeper 24 and the spring 26 forces the latch member 22 away from the keeper 24 and the hood 12 is moved slightly upward. At this point, the latch member 22 is either fully disengaged from the keeper 24 or is only partially disengaged from the keeper 24. In the latter case, in order to completely open the hood 12, the latch member 22 again must be manipulated manually by a user from the exterior of the vehicle.

The anti-theft vehicle device 18 prevents the release of the hood 12 in the absence of a specific activity performed by the operator and, when actuated, simultaneously activates or deactivates a desired electrical circuit. The anti-theft vehicle device 18 includes a cable member 28 that is moved longitudinally by a push lock assembly 30 to prevent release of the hood latch 14. Preferably, the push lock assembly 30 is mounted within the passenger section 20, but can be mounted in any desired location including the exterior of the vehicle 10.

The cable member 28 includes a first end 32 and a second end 34 and is used in conjunction with the push lock assembly 30 and the latch member 22. The first end 32 of the cable member 28 is secured to and can extend through a bracket member 36 which can be secured to, or proximate to, the latch member 22 within the engine compartment 16. As FIG. 1 illustrates, to inhibit the rotation of the latch member 22, the first end 32 of the cable 28 can be formed with an engagement ferrule 38 that can abut against, or be secured to, the latch member 22.

The second end 34 of the cable member 28 can be brought through a firewall 40 between the engine compartment 16 and the passenger section 20 and can be secured to the push lock assembly 30, as will be described later. The cable member 28 can be a braided cable or a flexible solid rod and can include an outer cover or sheath 42.

As FIG. 1 illustrates, upon longitudinal movement of the cable member 28, the ferrule 38 of the cable member 28 moves in the direction indicated by arrow B so that the latch member 22 is free to rotate. The hood 12 then can be opened upon disengagement of the latch member 22, as described above.

Although the cable member 28 is illustrated in FIG. 1 as being in communication with the latch member 22 to provide a positive locking of the hood 12, the cable member 28 alternatively may be in communication with a separate hood lock member 43. The hood lock member 43 is illustrated in another embodiment of the invention in FIG. 7 where common elements are designated by the same numerals. The hood lock member 43 is independent of the hood latch 14 and positively locks the hood 12.

Figure 7:
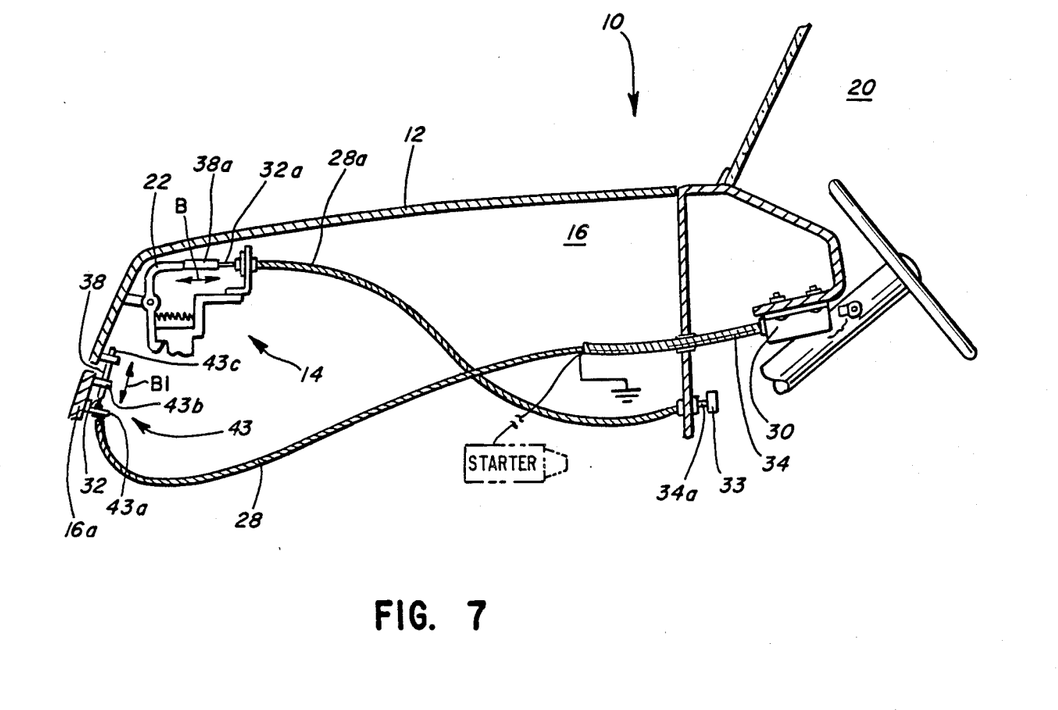
FIG. 7 is a representation of the hood and front compartment of a vehicle having an anti-theft vehicle device of a second embodiment of the invention installed therein.

In this embodiment, a separate cable 28a is utilized as the release cable for the hood latch 14 and is operable from the interior of the passenger compartment 20 by a handle member 33 secured to a second end 34a of the cable 28a. A ferrule 38a on a first end 32a of the cable 28a is secured directly to the latch member 22 to unlatch the hood 12 directly.

The hood lock member 43 is actuable through the cable 28. Upon longitudinal movement of the cable 28, the ferrule 38 locks and unlocks the hood lock member 43 and in turn locks and unlocks the hood 12 regardless of the operation of the hood latch 14. The cable 28 is secured at its second end 34 to the push lock assembly 30 within the passenger section 20. The first end 32 of the cable 28 is secured to the hood lock member 43 through a first bracket 43a. The ferrule 38 is secured to the first end 32 of the cable 28 and extends through an aperture formed in a second bracket 43b that is secured to a portion 16a of the engine compartment 16. The ferrule 38 is operable to extend through another aperture formed in a third bracket 43c that is secured to the hood 12. To positively lock the hood 12, the ferrule 38 can move in the direction indicated by arrow B1 to a first locked position where it extends through the aperture in the third bracket 43c. To unlock the hood 12, the ferrule 38 can move to a second unlocked position outside of the aperture in the third bracket 43c toward the second bracket 43b. Accordingly, the ferrule 38 locks and unlocks the hood 12 independent from the hood latch 14.

Referring now to the embodiment illustrated in FIGS. 26, the push lock assembly 30 of the anti-theft vehicle device 18 moves the cable 28 longitudinally to lock and unlock the hood latch 14. The push lock assembly 30 includes a housing 44, a push lock member 46, a cable clamp member 48, and an electrical contact assembly 50. The cable clamp member 48 secures the cable 28 to the push lock assembly 30. The push lock member 46 is actuable to longitudinally move the cable 28 and simultaneously contact the electrical contact assembly 50 that can in turn activate or deactivate a desired electrical component.

Figure 2:
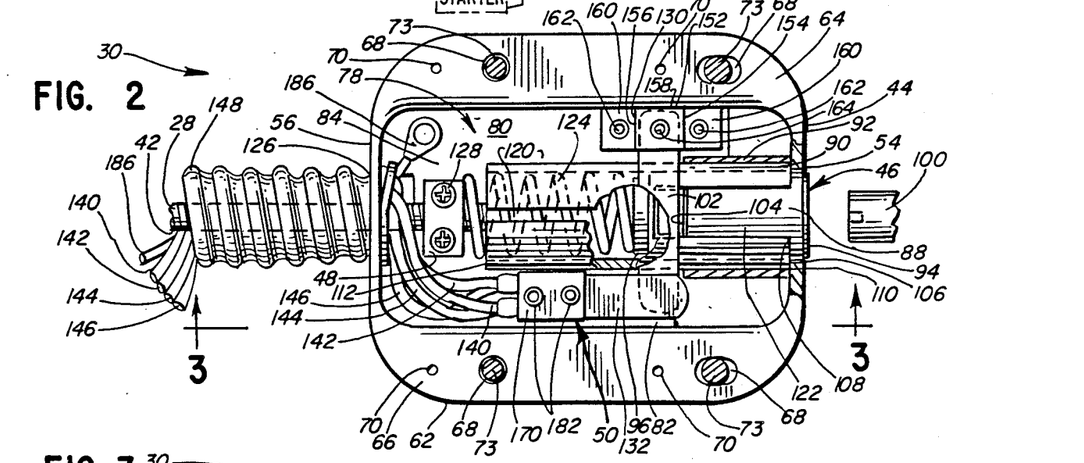
FIG. 2 is a bottom plan view, in partial section, taken along lines 2—2 of FIG. 1, illustrating the push lock assembly of the invention with its top cover removed and in its locked position.
Figure 5:
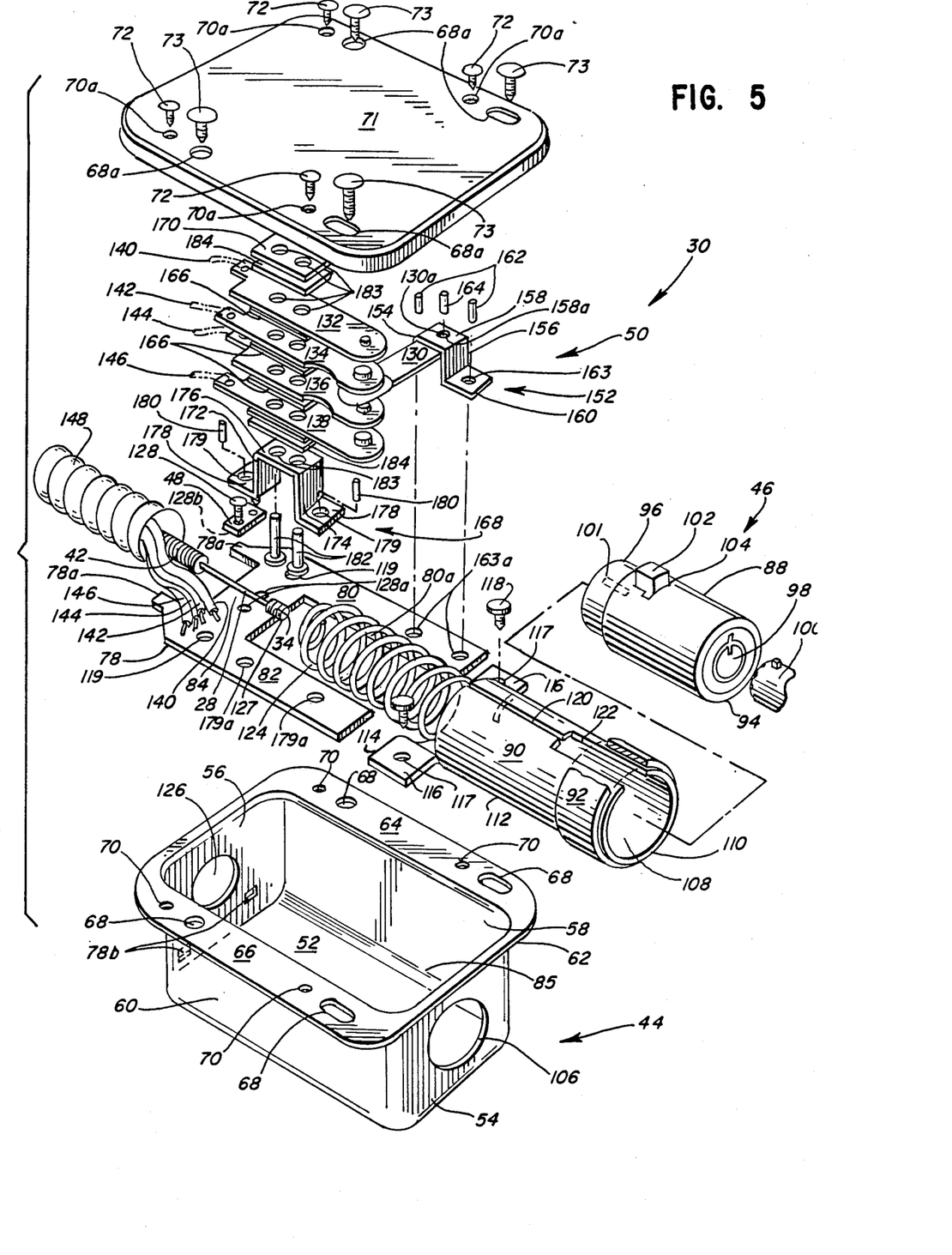
FIG. 5 is an exploded view of the push lock assembly of the invention.

The housing 44 houses the push lock member 46, the cable clamp member 48 and the electrical contact assembly 50. The housing 44 is preferably rectangular in shape and includes a bottom side 52, a front side 54, a rear side 56, a right side 58, and a left side 60. As FIGS. 2 and 5 illustrate, an outwardly extending peripheral flange 62 is formed around the top surface of the sides 54, 56, 58, and 60 having enlarged portions 64 and 66 on the top surfaces of the right side 58 and the left side 60 respectively. A plurality of large apertures 68 and a plurality of small apertures 70 are positioned around the enlarged portions 64 and 66 of the flange 62. The apertures 68 and 70 can vary in size and position and all or some of the apertures can be slotted apertures if desired. In this embodiment, two of the large apertures 68 are slotted for ease of assembly.

As FIG. 5 illustrates, to complete the housing 44, a top cover 71 is positioned over the flange 62 of the housing 44. The top cover 71 has a plurality of apertures 68a and 70a that correspond with the large and small apertures 68 and 70 of the housing 44. To fasten the top cover 71 to the housing 44, a fastener 72, such as a self-tapping screw or the like, is inserted and secured within the small apertures 70 and 70a.

As FIGS. 1 and 5 illustrate, the housing 44 and the top cover 71 are secured to a surface within the passenger section 20, such as an underside of a dashboard 74, by fasteners 73, such as a screw, bolt, or the like. The fasteners 73 extend through the large apertures 68a of the top cover 71, through the large apertures 68 of the housing 44, and through corresponding apertures (not illustrated) formed in the underside of the dashboard 74 and are secured thereto by nuts 76.

Figure 3:
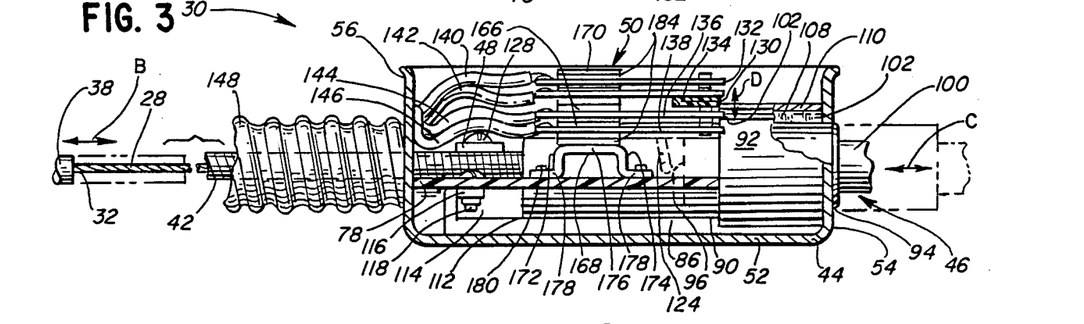
FIG. 3 is a detailed sectional view taken along lines 3—3 of FIG. 2, illustrating the unlocked position of the push lock assembly of the invention in dotted outline.

As FIGS. 2, 3, and 5 illustrate, the push lock member 46 is secured within the housing 44 by a bracket member 78 that is secured within the housing 44 proximate the bottom side 52 of the housing 44. The bracket member 78 is preferably made of metal and is U-shaped, being formed by walls 80 and 82 that are joined by an end wall 84. The open end of the U-shaped bracket member 78 faces the front side 54 of the housing 44 and provides a channel for the push lock member 46 which will be explained in greater detail hereinafter.

Figure 4:
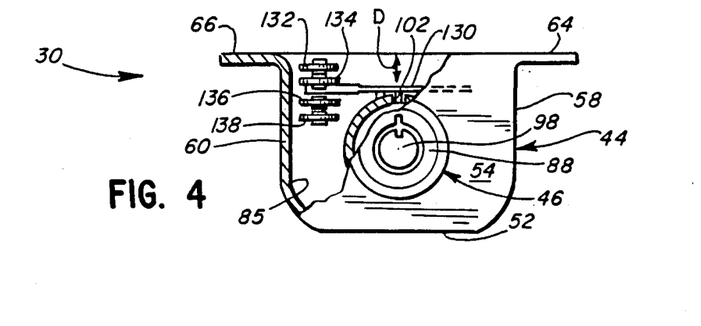
FIG. 4 is a front elevational view, in partial section, of the push lock assembly of the invention in its locked position.

In order to secure the U-shaped bracket member 78 within the housing 44, an interior seat or shoulder 85 is provided within the housing 44 by rounding off the edges between the bottom side 52 and the right and left sides 58 and 60 of the housing 44 as illustrated in FIGS. 4 and 5. When the U-shaped bracket member 78 is inserted within the housing 44, it abuts against the shoulder 85 and is restricted from further movement toward the bottom side 52 by the shoulder 85. As FIG. 5 illustrates, to hold the U-shaped bracket member 78 against the shoulder 85 and prevent its movement away from the bottom side 52, the U-shaped bracket member 78 can be formed with outwardly extending leg members 78a on its end wall 84. The leg members 78a snappingly engage within apertures 78b formed in the rear side 56 of the housing 44 to hold the U-shaped bracket member 78 in place. Alternatively, the U-shaped bracket member 78 can be secured by a fastener (not illustrated) or in any other desired way. Accordingly, as FIG. 3 illustrates, an interior chamber 86 is formed between the bottom of the U-shaped bracket member 78 and the bottom side 52 of the housing 44.

As was briefly described above, the push lock member 46 is received within the channel formed by the U-shaped bracket member 78 and extends beneath the U-shaped bracket member 78 into the interior chamber 86. As FIGS. 5 and 6 more appropriately illustrate, the push lock member 46 includes a keyed cylindrical lock housing or lock member 88, a cylindrical sleeve member 90 and a short cylindrical bushing or tube member 92.

When assembled, the bushing member 92 surrounds the sleeve member 90 and the lock housing 88 can move longitudinally within the sleeve member 90. The lock housing 88 is in operable communication with the cable 28 to move the cable 28 longitudinally to lock and unlock the hood latch 14. Preferably, the lock housing 88, the sleeve member 90, and the bushing member 92 are made of metal, but can be made of any desired material so long as the push lock assembly 30 functions as described.

The keyed cylindrical lock housing 88 includes a first longitudinal end 94 and a second longitudinal end 96 and houses a tumbler assembly (not illustrated) within its interior. The first longitudinal end 94 of the lock housing 88 includes an internal axially extending key aperture or keyhole 98 for insertion of a corresponding key member 100. Preferably, both the keyhole 98 and key member 100 are of the circular type and are designed for restricted distribution for security. It is to be noted, however, that the type of key member 100 and keyhole 98 can vary.

To provide engagement between the lock housing 88 and the cable 28, the second longitudinal end g6 of the lock housing 88 includes an internally threaded axial aperture 101 (illustrated in dotted outline in FIG. 5). The threaded axial aperture 101 extends a predetermined axial distance into the lock housing 88 and threadingly engages with the second end 34 of the cable member 28 as will be explained later.

To secure and guide the lock housing 88 as it moves longitudinally within the sleeve member 90, the lock housing 88 includes an engagement or cam member 102. The cam member 102 is positioned proximate the second longitudinal end 96 of the lock housing 88 and extends radially outward with respect to the lock housing 88 through an aperture 104 formed in the lock housing 88. The cam member 102 is outwardly spring biased by a spring member (not illustrated) that is positioned within the interior of the lock housing 88. The cam member 102 can be moved into the interior of the lock housing 88 if forced inwardly to overcome the force of the spring bias.

To move the cam member 102 inward and outward, the cam member 102 is in operable communication with the tumbler assembly of the lock housing 88. Upon rotation of the key member 100, the tumbler assembly can move the cam member 102 inward and outward through the aperture 104 in the lock housing 88 regardless of the spring bias of the cam member 102.

When the push lock assembly 30 is assembled, the lock housing 88 extends through a central aperture 106 formed in the front side 54 of the housing 44 and is received within an interior 108 of the sleeve member 90. To accept the lock housing 88, the central aperture 106 has a diameter slightly larger than the outside diameter of the lock housing 88 but slightly smaller than the diameter of the sleeve member 90 so that the sleeve member 90 cannot move through the central aperture 106. The lock housing 88 is capable of longitudinal movement within the sleeve member 90 and through the central aperture 106 to positions both inside and outside of the housing 44.

The sleeve member 90 has a first longitudinal end 110 and a second lonitudinal end 112. When assembled, the first longitudinal end 110 of the sleeve member 90 abuts the interior surface of the front side 54 of the housing 44 around the central aperture 106. To secure the sleeve member 90 within the housing 88, a bracket member 114 extends outwardly axially away from the bottom of the sleeve member 90 a its second longitudinal end 112. The bracket member 114 includes two tab members 116 extending perpendicularly therefrom. The bracket member 114 is preferably semicircular in shape having the same radius as the sleeve member 90. The tab members 116 (only one of which is illustrated in FIG. 3) each include at least one aperture 117 that accepts a fastener 118 for securing each tab member 116 within apertures 119 of the end wall 84 of the U-shaped bracket member 78. As FIGS. 2 and 3 illustrate, both the sleeve member 90 and the lock housing 88 are positioned within the channel formed by the U-shaped bracket member 78.

Figure 6:
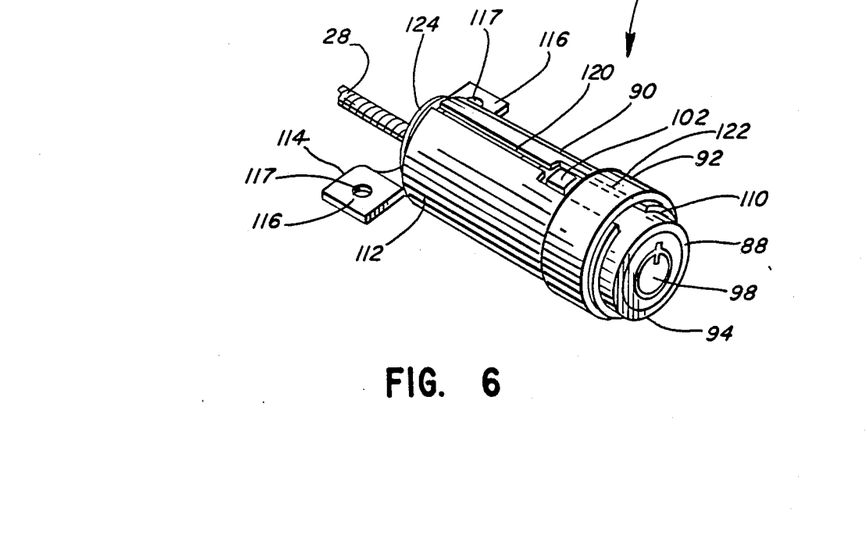
FIG. 6 is an enlarged perspective view of a portion of the push lock assembly illustrating the push lock member in greater detail.

The sleeve member 90 can be bent into its cylindrical shape from a flat piece of material, such as metal, and includes a slot 120 formed along the seam of the sleeve member 90 and extends the longitudinal length of the sleeve member 90. To guide the cam member 102 as it moves longitudinally within the sleeve member 90, an enlarged slot portion 122 is formed along the slot 120. The enlarged slot portion 122 begins at the first longitudinal end 110 of the sleeve member 90, and extends toward the second longitudinal end 112 to a position proximate the longitudinal midpoint of the sleeve member 90. As FIGS. 2 and 6 illustrate, when assembled, the cam member 102 of the lock housing 88 rides within the enlarged slot portion 122 of the slot 120. The enlarged slot portion 122 restricts the rotation of the cam member 102 and the lock housing 88 within the sleeve member 90. Alternatively, the sleeve member 90 can be formed in any desired way and the seam of the sleeve member 90 can be closed thereby eliminating the slot 120 while maintaining the enlarged slot portion 122 without departing from the teachings of the present invention.

To outwardly bias the lock housing 88 with respect to the sleeve member 90 and the housing 44, a spring member 124 is positioned within the interior 108 of the sleeve member 90. The spring member 124 cooperates with the lock housing 88 to provide the desired "push lock" effect. Accordingly, as will be explained later, the lock housing 88 is movable inward to a first "locked" position, as illustrated in FIGS. 2, 3, and 6, and is movable outward to a second "unlocked" position, as illustrated in dotted outline in FIG. 3.

When assembled, to secure the spring member 124 within the sleeve member 90, one end of the spring member 124 extends slightly outward from the second longitudinal end 112 of the sleeve member 90 and abuts against the end wall 84 of the U-shaped bracket member 78. The other end of the spring member 124 engages the second longitudinal end 96 of the lock housing 88. When the spring member 124 is in its at rest position, it maintains the lock housing 88 in its unlocked position where the first end 94 of the lock housing 88 is slightly outside of both the sleeve member 90 and the housing 44. Accordingly, to move the lock housing 88 to its locked position, the outward bias of the spring member 124 must be overcome in order to insert the lock housing 88 into the sleeve member 90 in the direction indicated by arrow C of FIG. 3.

To move the lock housing 88 inward, a user merely pushes the lock housing 88 inward until the cam member 102 clears an inner edge of the bushing member 92. At that point, the cam member 102 extends further outward and engages the inner edge of the bushing member 92 and holds the lock housing 88 in its locked position against the force of the spring 124.

The short bushing or tube member 92 is positioned just inside the front side 54 of the housing 44 and surrounds both the sleeve member 90, including the slots 120 and 122, and the lock housing 88. When assembled, the bushing member 92 is prevented from moving longitudinally with respect to the sleeve member 90 since it abuts against the inside surface of the front side 54 of the housing 44 on one end and against a cut-out 80a formed in the wall 80 of the U-shaped bracket member 78 on its other end as illustrated in FIG. 5. The bushing member 92 restricts the outward expansion of the sleeve member 90 as well as the outward movement of the outwardly spring biased cam member 102 of the lock housing 88 as the lock housing 88 is pushed into the sleeve member 90.

When the lock housing 88 is advanced inward within the sleeve member 90 against the force of the spring member 124, the cam member 102 rides in the enlarged slot 122 and slides against the inside surface of the bushing member 92 which restricts outward movement of the cam member 102. Once the cam member 102 clears the inner edge of the bushing member 92, it extends outwardly beyond the bushing member 92 due to the spring bias of the cam member 102. Accordingly, the cam member 102 engages the inner edge of the bushing member 92 and maintains the lock housing 88 in its locked position against the outward force of the spring member 124.

To position the lock housing 88 in its outward unlocked position, the key member 100 is rotated and the tumbler assembly retracts the cam member 102 into the lock housing 88. As soon as the cam member 102 clears the inner edge of the bushing member 92, the spring member 124 pops the lock housing 88 to its outward position.

To prevent the lock housing 88 from being forced completely out of the sleeve member 90 and the housing 44, the cam member 102 limits its outward longitudinal movement. As FIG. 3 illustrates, when the cam member 102 reaches the outside end of the enlarged slot 122, it engages the interior surface of the front side 54 of the housing 44 which stops the outward motion of the lock housing 88. The cam member 102 cannot be retracted completely within the lock housing 88 so that it can retain the lock housing 88 within the housing 44. A more detailed description of the operation of the lock housing 88 will be provided hereinafter.

The cable member 28 and its sheath 42 enter the rear side 56 of the housing 44 through an aperture 126 formed therein. As described earlier, the second end 34 of the cable 28 is secured to the lock housing 88. In order to secure the cable 28 to the lock housing 88, the second end 34 of the cable 28 can be threaded, if it is a rod, or can include an externally threaded ferrule 127 that threadingly engages with the threaded aperture 101 in the second longitudinal end 96 of the lock housing 88.

As FIGS. 2, 3, and 5 illustrate, in order to permit the cable 28 to slide within the sheath 42, the sheath 42 must be secured to the housing 44. To secure the sheath 42 to the housing 44, the sheath 42 of the cable 28 extends into the housing 44 and is positioned against the top surface of the end wall 84 of the U-shaped bracket member 78. The cable clamp member 48 is positioned over and engages the sheath 42. As the clamp member 48 is secured to the end wall 84 by screws 128 the clamp member 48 compresses the sheath 42 against the end wall 84 and secures the sheath 42 thereto. The screws 128 are preferably self-tapping screws that engage corresponding apertures 128a and 128b in the end wall 84 and the cable clamp member 48, respectively as FIG. 5 illustrates. It is to be noted, however, that the clamp member 48 can only be tightened enough to restrict motion of the sheath 42 without restricting the motion of the cable 28 within the sheath 42. Additionally, the sheath 42 can be cut off at the point corresponding to the clamp member 48, thereby baring the second end 34 of the cable 28, or can extend to a position proximate the second longitudinal end 96 of the lock housing 88.

As FIGS. 2-5 illustrate, in order to activate or deactivate a desired electrical component, the electrical contact assembly 50 includes a contact arm 130 that engages four contact fingers 132, 134, 136, and 138 that are connected to four wiring leads 140, 142, 144, and 146 respectively. Upon opening and closing of the contact fingers 132, 134, 136, and 138 by the contact arm 130, a desired electrical circuit can be controlled. The wiring leads 140, 142, 144, and 146 enter the housing 44 through the aperture 126 formed in the rear side 56 of the housing 44 along with the cable 28 and the sheath 42.

For protection within the engine compartment 16, a flexible tube 148 can enclose the wiring leads 140, 142, 144, and 146 as well as the cable 28 and the sheath 42. The flexible tube 148 can be secured to the housing 44 by a force fit within the aperture 126 in the rear side 56 or can be secured in any other way. Additionally, the flexible tube 148 can have external ribs or can be externally threaded to provide strength to the flexible tube 148 without decreasing its flexibility and to provide the necessary force fit.

The wiring leads 140, 142, 144, and 146 are secured at their other ends to a desired electrical component such as a starter 150, as illustrated in FIG. 1. Alternatively, the wiring leads 140, 142, 144, and 146 can be secured to any other desired component, such as, for example, an alarm, a motion detector or similar device. Additionally, the number of wiring leads can vary and they can be connected to a plurality of devices without departing from the teachings of the invention.

As FIGS. 2 and 5 illustrate, the contact arm 130 is secured to the wall 80 of the U-shaped bracket member 78 by a support member 152. The support member 152 is also generally U-shaped and includes wall members 154 and 156 that are joined by an end wall 158. To secure the support member 152 to the wall 80 of the U-shaped bracket member 78, each wall member 154 and 156 has a tab 160 extending outwardly therefrom that is secured to the wall 80 of the bracket member 78 by a fastener, such as a rivet 162. The rivets 162 extend through apertures 163 and 163a formed in the tabs 160 and the wall 80 of the bracket member 78, respectively. The contact arm 130 is similarly secured to the end wall 158 of the support member 152 by a rivet 164 that extends through apertures 130a and 158a formed in the contact arm 130 and the end wall 158 respectively.

As FIGS. 2-5 illustrate, the contact arm 130 extends across and lies in close proximity to the top of the sleeve member 90 and the inside end of the enlarged slot 122 within the housing 44 to the opposite side of the U-shaped bracket member 78 and is interleaved between the contact fingers 134 and 136. The contact arm 130 is to be engaged by the cam member 102 when the cam member 102 clears the inner edge of the bushing member 92 and locks the lock housing 88 in its locked position. Upon upward movement of the contact arm 130 along the path designated by arrow D, the contact between contact fingers 132 and 134 is closed and the contact between contact fingers 136 and 138 is opened. Upon downward movement of the contact arm 130 along the path designated by arrow D, the contact between the contact fingers 136 and 138 closes while the contact between contact fingers 132 and 134 is opened. The closing or opening of the contact fingers 132, 134, 136, and 138 can provide activation or deactivation of the starter 150, suppress the ignition system of the vehicle 10, or activate or deactivate any other device. Preferably, the contact arm 130 is elastically deformable and is slightly spring biased downwardly so that the contact between contact fingers 136 and 138 is closed when the contact arm 130 is in its at rest position.

The contact fingers 132, 134, 136, and 138 are arranged in a stack and are insulated from each other by insulating members 166. A bracket 168 having a corresponding top plate member 170 is used to secure the contact fingers 132, 134, 136, and 138 to the wall 82 of the U-shaped bracket member 78. The bracket 168 is also generally U-shaped and includes wall members 172 and 174 that are joined by an end wall 176. To secure the bracket 168 to the wall 82 of the U-shaped bracket member 78, each wall member 172 and 174 has an outwardly extending tab 178 that is secured to the wall 82 of the bracket member 78 by a fastener, such as a rivet 180. The rivets 180 extend through apertures 179 and 179a formed in both the tabs 178 and the wall 82 of the bracket member 78, respectively.

The contact fingers 132, 134, 136, and 138 are preferably secured to the end wall 176 of the bracket 168 by at least two rivets 182. The rivets 182 extend through apertures 183 formed through the contact fingers 132, 134, 136, and 138 as well as the top plate 170, the insulating members 166, and the end wall 176 of the bracket 168. As FIG. 3 illustrates, an insulating member 184 can also be positioned between the top plate 170 and the contact finger 132 as well as between the contact finger 138 and the end wall 176 of the bracket 168.

As FIG. 2 illustrates, to ground the push lock assembly 30, a ground wire 186 can be secured within the housing 44, such as, for example, to the U-shaped bracket member 78. The ground wire 186 exits the housing 44 through the aperture 126 and can run through the flexible tube 148 to be properly secured at its other end to a suitable ground within the engine compartment 16, as FIG. 1 illustrates.

In operation, when the lock housing 88 is in its inward locked position as illustrated in FIGS. 1-3, the cable member 28 prevents the latch member 22 of the hood latch 14 from being opened while the cam member 102 is outwardly biased against the contact arm 130, thereby forcing the contact arm 130 upward along the path designated by arrow D. This causes the contact between contact fingers 136 and 138 to be open which, in the illustrated embodiment, can, for example, disable the starter 150. At the same time, the contact between contact fingers 132 and 134 is closed, which can, for example, activate an alarm, a motion detector or similar device. The lock housing 88 is held in this inward locked position against the outward force exerted by the spring 124 by the cam member 102 which engages with the inner edge of the bushing member 92.

To position the lock housing 88 in its unlocked position as illustrated in dotted outline in FIG. 3, the key 100 is inserted within the keyhole 98 and is rotated by a user. Upon rotation of the key member 100, the tumbler assembly moves the cam member 102 inward with respect to the lock housing 88. The inward motion of the cam member 102 simultaneously opens the contact between the contact fingers 132 and 134, closes the contact between the contact fingers 136 and 138 and permits the lock housing 88 to be moved outward to its unlocked position by the spring member 124 with respect to the sleeve member 90 and the housing 44 along the path designated by arrow C. More specifically, when the cam member 102 is moved inwardly, the contact arm 130 can move downward along the path designated by arrow D, due to its slight spring bias, thereby breaking the contact between the contact fingers 132 and 134 while at the same time, the contact arm 130 makes contact between the contact fingers 136 and 138. Alternatively, the contact arm 130 can move downward to a position intermediate the contact fingers 134 and 136 to open both contacts or can be moved to any other desired position.

Additionally, at the same time, the spring 124 can now force the lock housing 88 longitudinally outward since the lock housing 88 is no longer held by the cam member 102 against the inner edge of the bushing member 92. The outward motion of the lock housing 88 in turn pulls the cable 28 within the sleeve member 42 and moves the ferrule 38 along the path designated by arrow A away from the latch member 22 so that the hood latch 14 can be opened. If desired, the key member 100 can be removed.

As FIG. 3 illustrates, when the cam member 102 is retracted within the lock housing 88 to its inward position, it still protrudes slightly from the lock housing 88 through the enlarged slot portion 122 of the sleeve member 90. Accordingly, as the lock housing 88 moves outward, the cam member 102 rides within the enlarged slot 122 and slides against the inside of the bushing member 92. To limit its outward longitudinal motion, the lock housing 88 is held within the housing 44 in its unlocked position against the force of the spring 124 by the cam member 102 which engages the interior surface of the front side 54 of the housing 44.

In order to return the lock housing 88 to its locked position, a user merely pushes the first longitudinal end 94 of the lock housing 88 into the housing 44 of the push lock assembly 30 against the force of the spring 124. As the lock housing 88 is advanced, the slightly protruding cam member 102 returns along the enlarged slot portion 122 of the sleeve member 90. Upon clearing the inner edge of the bushing member 92, the cam member 102, which is outwardly spring biased, moves outward and hooks behind the inner edge of the bushing member 92. This maintains the lock housing 88 in its locked position until the cam member 102 is again retracted by the key member 100 as explained above to position the lock housing 88 in its outward position. As the lock housing 88 is advanced inward, the cable member 28 locks the latch member 22 of the hood latch 14 and the cam member 102 engages the contact arm 130 to activate or deactivate a desired electrical circuit or circuits.

Modifications and variations of the present invention are possible in light of the above teachings. A specific dimension, material, or construction is not required so long as the assembled device is able to function as herein described. It is therefore to be understood that within the scope of the appended claims, the invention may be practiced otherwise than as specifically described.

What is claimed and desired to be secured by letters patent of the United States is:

1. A push lock actuable anti-theft vehicle device for a vehicle having a hood comprising:
   coupling means for coupling the hood to said vehicle secured within an engine compartment of the vehicle and having a first locked position and a second unlocked position;
   a cable secured at one end to said coupling means, said cable being manipulable to lock and unlock said coupling means;
   push lock means for manipulating said cable to lock and unlock said coupling means coupled to the other end of said cable, said push lock means being manually operable between a first position wherein said cable is manipulated to lock said coupling means and wherein said push lock means are keyed and are operable by a key to a second position wherein said cable is manipulated to unlock said coupling means, said push lock means including an engagement member having at least two operating positions provided by movement of said push lock means between said first and second positions; and
   electrical contact means for opening and closing at least two desired electrical circuits, said contact means being in communication with said engagement member of said push lock means to operate said electrical contact means upon movement of said push lock means between said first and second positions so that when said engagement member is positioned in one of said at least two operating positions it opens a first of said at least two circuits and closes a second of said circuits and when said engagement member is positioned in the other operating position it closes said first circuit and opens said second circuit.

2. The device as defined in claim 1 wherein said coupling means includes a hood latch member and said cable is manipulable to lock said hood latch member and render said hood latch member inoperable and to unlock said hood latch member and enable proper operation of said hood latch member.

3. The device as defined in claim 2 wherein said hood latch member is operable from the exterior of said vehicle.

4. The device as defined in claim 2 wherein said vehicle includes a release cable that enables operation of said hood latch member remotely from the interior of said vehicle.

5. The device as defined in claim 1 wherein said vehicle includes a hood latch member operable from the exterior of said vehicle and said coupling means includes a hood lock member, independent of said hood latch member and positioned remotely with respect to said hood latch member, and said cable is manipulable to lock and unlock said hood lock member.

6. The device as defined in claim 5 wherein said vehicle includes a release cable to enable operation of said hood latch member remotely from the interior of said vehicle.

7. The device as defined in claim 1 wherein said push lock means includes a keyed cylindrical housing member that moves longitudinally between said first and second positions to longitudinally manipulate said cable and to operate said electrical contact means with said engagement member.

8. The device as defined in claim 7 wherein said cylindrical housing includes first and second longitudinal ends, said second longitudinal end of said cylindrical housing being secured to said cable, said keyed cylindrical housing being actuable through said first longitudinal end of said housing by a key member, and wherein said cylindrical housing can be manually actuated to said first position to manipulate said cable and lock said coupling means and said cylindrical housing is retained in said first position by said engagement member, and said key member can actuate said cylindrical housing member to release said engagement member and return said cylindrical housing to said second position to manipulate said cable and unlock said coupling means.

9. The device as defined in claim 8 wherein said cylindrical housing is surrounded by, and is capable of longitudinal movement within, a cylindrical sleeve member between said first and second positions, said sleeve member having an open end and a closed end and a spring member secured within said closed end of said sleeve member to contact said second end of said cylindrical housing and to spring bias said cylindrical housing outward toward said open end of said sleeve member, said engagement member being capable of retaining said cylindrical housing in said first position against the force exerted by said spring member and wherein said key member can actuate said cylindrical housing member to disengage said engagement member and allow said spring member to move said cylindrical housing to said second position.

10. The device as defined in claim 9 wherein said engagement member includes a cam member extending radially outward from a side wall of said cylindrical housing, said cam member being outwardly spring biased with respect to said cylindrical housing and being received within a longitudinal slot formed in said sleeve member, said cylindrical housing being actuable by said key member between a first position that positions said cam member outwardly and a second position that retracts said cam member to a position within said cylindrical housing.

11. The device as defined in claim 10 including a bushing member surrounding said sleeve member and said cylindrical housing proximate said open end of said sleeve member, said bushing member being capable of engaging said cam member in said outward position to hold said cylindrical housing in said first position within said sleeve member against the force of said spring member and when said cam member is positioned in said retracted position, said cam member disengages from said bushing member and said cylindrical housing is forced to said second position by said spring member.

12. The device as defined in claim 11 wherein said cam member operates said electrical contact member when said cam member is in said outward position and said cylindrical housing is in said first position to respectively open and close said at least two electrical circuits and said cam member operates said electrical contact means when said cam member is in said retracted position to respectively close and open said at least two electrical circuits.

* * * * *